(12) United States Patent
Qu et al.

(10) Patent No.: US 12,493,606 B2
(45) Date of Patent: Dec. 9, 2025

(54) REDUCING COMMUNICATION OVERHEAD FOR REPLICA GARBAGE COLLECTION

(71) Applicant: Dell Products L.P., Round Rock, TX (US)

(72) Inventors: Huidong Qu, Shanghai (CN); Dong Wang, Shanghai (CN); Vicky Huiqin Sheng, Shanghai (CN); Haoyuan Song, Shanghai (CN); Kenneth Andersen, Fermoy (IE)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/620,545

(22) Filed: Mar. 28, 2024

(65) Prior Publication Data
US 2025/0245213 A1 Jul. 31, 2025

(30) Foreign Application Priority Data
Jan. 26, 2024 (CN) .......................... 202410114405.1

(51) Int. Cl.
*G06F 16/00* (2019.01)
*G06F 16/22* (2019.01)
*G06F 16/23* (2019.01)

(52) U.S. Cl.
CPC ...... *G06F 16/2365* (2019.01); *G06F 16/2255* (2019.01)

(58) Field of Classification Search
CPC .......................... G06F 16/2365; G06F 16/2255
USPC .......................................................... 707/690
See application file for complete search history.

(56) References Cited

U.S. PATENT DOCUMENTS

| 9,396,202 B1* | 7/2016 | Drobychev | G06F 16/178 |
| 2012/0191931 A1* | 7/2012 | Bricker | G06F 16/1748 |
| | | | 711/E12.103 |
| 2020/0012598 A1* | 1/2020 | Feng | G06F 3/064 |

* cited by examiner

*Primary Examiner* — Raquel Perez-Arroyo
(74) *Attorney, Agent, or Firm* — Amin, Turocy & Watson, LLP

(57) ABSTRACT

The described technologies relate to efficient data collection. For instance, data collection information is generated based on a source data block and a target data block in a local data station. The data collection information is sent to a remote data station for data collection thereby based on the data collection information. In addition, data collection can be performed in the local data station based on the source data block and the target data block responsive to receiving a collection completion response from the remote data station. Since the size of the data collection information is much smaller than that of the valid data block, the amount of data sent by the local data station to other remote data stations is significantly reduced, thereby improving the performance efficiency of data collection and avoiding the impact of data collection on the storage performance of the local data station and other tasks.

20 Claims, 6 Drawing Sheets

REDUCING COMMUNICATION OVERHEAD FOR REPLICA GARBAGE COLLECTION

RELATED APPLICATION

The present application claims the benefit of priority to Chinese Patent Application No. 202410114405.1, filed on Jan. 26, 2024, which application is hereby incorporated into the present application by reference herein in its entirety.

TECHNICAL FIELD

Embodiments of the present disclosure relate to the field of computers, and more particularly, to data collection.

BACKGROUND

Geo replication plays a helpful role in data storage services, improves the availability and flexibility of the services, and deals with regional failures effectively. By replicating data in a geographical location, copies of the data can be maintained in different geographical regions. This redundancy allows copies in other regions to be available even when a fault occurs in one region, thus ensuring the continuous operation of a system.

In data storage services, garbage collection is also beneficial. Collection of garbage data can release garbage data that is no longer used, thus releasing the storage space and improving the efficiency of reading and writing operations of the storage services. Moreover, the garbage collection task helps to maximize the usage of storage resources and reduce unnecessary space waste, thus ensuring the stable and efficient operation of the storage services.

SUMMARY

Example embodiments of the present disclosure provide a method, a device, and a computer program product for data collection.

In an example embodiment of the present disclosure, a method for data collection is provided. The method includes generating data collection information based on a source data block and a target data block in a local data station. The method further includes sending the data collection information to a remote data station, where data collection of the remote data station is performed based on the data collection information. In addition, the method further includes performing data collection in the local data station based on the source data block and the target data block in response to receiving a collection completion response from the remote data station.

In another example embodiment of the present disclosure, an electronic device is provided. The device includes a processing unit and a memory, where the memory is coupled to the processing unit and has instructions stored therein. The instructions, when executed by the processing unit, perform actions comprising: generating data collection information based on a source data block and a target data block in a local data station; sending the data collection information to a remote data station, wherein data collection of the remote data station is performed based on the data collection information; and performing data collection in the local data station based on the source data block and the target data block in response to receiving a collection completion response from the remote data station.

In still another example embodiment of the present disclosure, a computer program product is provided. The computer program product is tangibly stored in a non-transitory computer-readable medium and contains computer-executable instructions. The computer-executable instructions, when executed, cause a computer to perform a method or process according to the embodiments of the present disclosure.

The Summary section is provided to introduce the selection of concepts in a simplified form, which will be further described in the Detailed Description below. This Summary section is neither intended to identify key features or essential features of the present disclosure, nor intended to limit the scope of the embodiments of the present disclosure.

BRIEF DESCRIPTION OF THE DRAWINGS

By description of exemplary embodiments of the present disclosure in more detail with reference to the accompanying drawings, the above and other objects, features, and advantages of the present disclosure will become more apparent. In the exemplary embodiments of the present disclosure, the same reference numerals generally represent the same elements.

DETAILED DESCRIPTION

Figure 1:
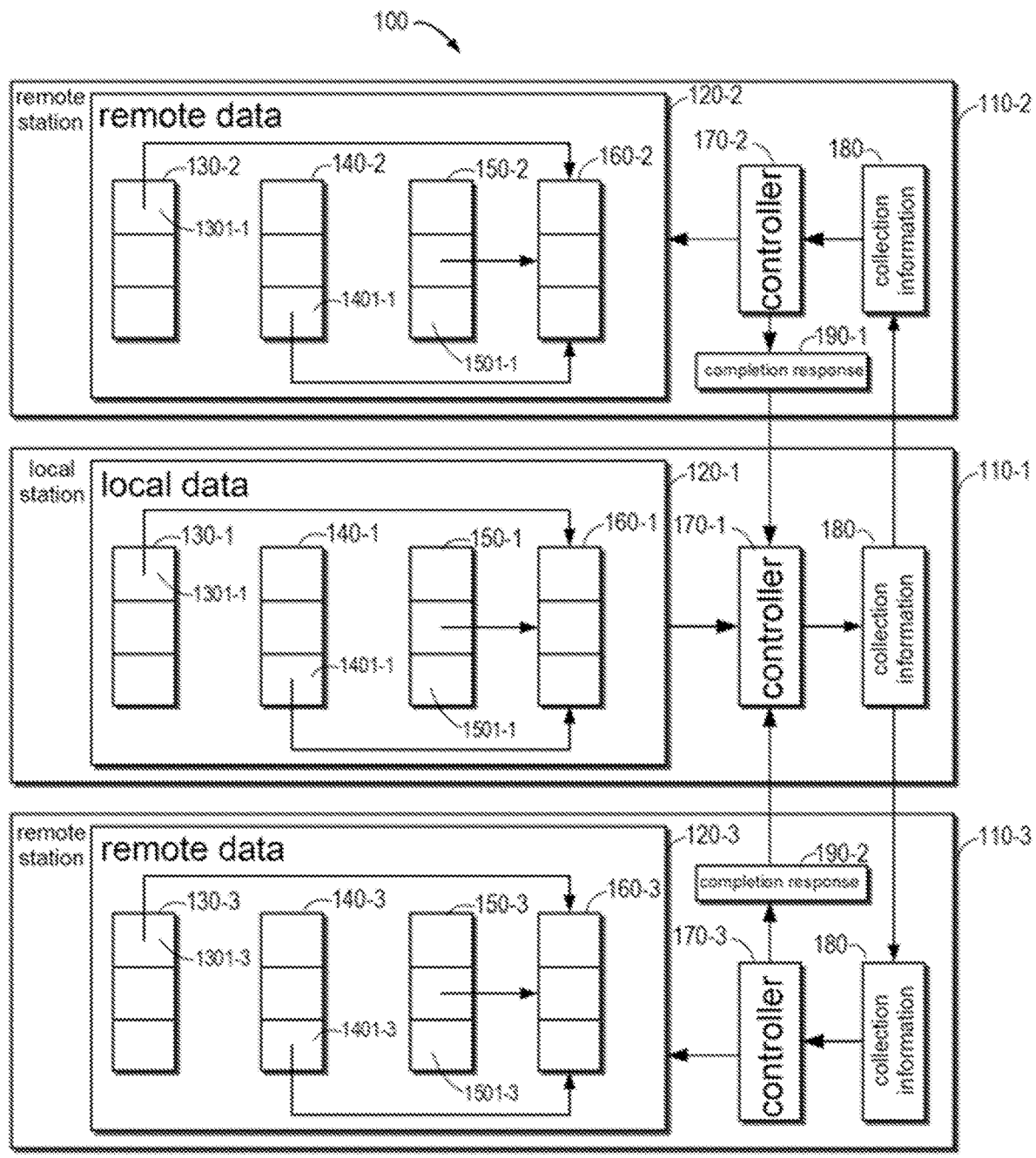
FIG. 1 shows a schematic diagram of an example environment of a storage system according to an embodiment of the present disclosure.

Example embodiments of the present disclosure will be described in further detail below with reference to the accompanying drawings. While some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" mean "at least one example embodiment." The term "another embodiment" means "at least one additional embodiment." The terms "first," "second," and the like may refer to different or identical objects, unless otherwise specifically indicated.

As mentioned above, garbage data collection is beneficial for data storage services. In addition, the data storage services often have multiple data storage stations, and data changes at the local storage station need to be synchronized with multiple remote storage stations. Similarly, when garbage data collection is performed in the local data storage station, the data stored in the data block of the local storage station will be changed, so it is necessary for synchronization with multiple remote data storage stations as well. In the following description, garbage data collection may be referred to as data collection.

In the related technologies of data synchronization in data collection, the valid data blocks obtained after completion of collection are usually replicated to other remote data storage stations. As the valid data blocks occupy a large amount of memory and need to be replicated to many remote storage stations, and many garbage collection tasks often run in the local storage services, the above factors make it necessary for the local data storage station to synchronize a large number of data blocks with many remote data storage stations, which affects the storage performance of the local data storage station, obstructs the garbage collection task, and even affects other tasks.

In view of this, embodiments of the present disclosure propose a solution for data collection. When garbage data collection is performed in a local storage station, instead of valid data blocks, data collection information is sent to other remote data storage stations so as to synchronize source data blocks and target data blocks involved in data collection with other remote storage stations. Other remote storage stations perform data collection based on the data collection information, and notify the local storage station after completion of performance, and the local data storage station performs data collection after receiving a completion response from other remote data storage stations.

As such, in the data collection solution proposed by the embodiments of the present disclosure, since the size of the data collection information is much smaller than that of a valid data block, the amount of data sent by the local data storage station to other remote data storage stations can be significantly reduced, thereby improving the performance efficiency of data collection and avoiding the impact on the storage performance of the local data storage station and other tasks.

The basic principles and some example implementations of the present disclosure are illustrated below with reference to FIG. 1 to FIG. 6. It should be understood that these exemplary embodiments are given only to enable those skilled in the art to better understand and thus implement the embodiments of the present disclosure, and are not intended to limit the scope of the present disclosure in any way.

FIG. 1 is a schematic diagram of an example environment 100 of a storage system according to an embodiment of the present disclosure. The example environment 100 shows a local data storage station 110-1 (hereinafter referred to as a local station), remote data storage stations 110-2 and 110-3 (hereinafter referred to as remote stations), and it should be understood that only two remote stations are shown here as an example, and in fact, fewer or more remote stations may be included. As shown in FIG. 1, the local station 110-1 includes local data 120-1. The local data 120-1 includes a source data block 130-1, a source data block 140-1, a source data block 150-1, and a target data block 160-1. It should be understood that three source data blocks are shown here as an example, and in fact, fewer or more source data blocks may be used. When performing data collection, the local station 110-1 can determine that valid data 1301-1 in the source data block 130-1 needs to be preserved, and the data in other parts is garbage data. It should be understood that only one piece of valid data is shown here on each source data block as an example. In fact, there may be more valid data on each source data block, or there may be more location ranges of valid data, which is not limited by the present disclosure.

Similarly, the local station 110-1 can determine that valid data 1401-1 in the source data block 140-1 and valid data 1501-1 in the source data block 150-1 need to be preserved, and can merge these valid data into the target data block 160. As the target data block 160 has the valid data stored therein, it can be regarded as a valid data block. It can be understood that the size of the target data block 160 is usually large (e.g., 128 MB), so if the target data block 160 is directly replicated to a remote station, this will consume numerous storage resources, network resources, and the like. In addition, the controller 170-1 in the local station 110-1 can generate collection information 180 (e.g., of a size of 1495 bytes) based on these source data blocks and the target data block 160-1, and the collection information 180 can record the location information of the valid data in the source data blocks and the target data block 160-1 to which the valid data is to be merged. The controller 170-1 can send the collection information 180 to the remote stations 110-2 and 110-3.

As shown in FIG. 1, after receiving the collection information 180, the remote station 110-2 can perform data collection (i.e., the garbage collection task) based on the collection information 180. For example, based on the collection information 180, the controller 170-2 in the remote station 110-2 can determine the source data block 130-2, the source data block 140-2, and the source data block 150-2, determine the valid data 1301-2, the valid data 1401-2, and the valid data 1501-2, and then merge the valid data into the target data block 160-2. As the remote data 120-2 in the remote station 110-2 is the backup data of the local data 120-1 in the local station 110-1, data collection can be completed based on the collection information 180. That is, the target data block 160-2 can be generated based on the collection information 180, and it is not necessary to directly receive the target data block 160-1 from the local station 110-1 for backup, thus ensuring the consistency of data between the remote data 120-2 and the local data 120-1. Similarly, after receiving the collection information 180, the remote station 110-3 can perform data collection based on the collection information 180. For example, based on the collection information 180, the controller 170-3 in the remote station 110-3 can determine the source data block 130-3, the source data block 140-3, and the source data block 150-3, determine the valid data 1301-3, the valid data 1401-3, and the valid data 1501-3, and then merge the valid data into the target data block 160-3.

With continued reference to FIG. 1, after the remote station 110-2 completes data collection, it can generate and send a completion response 190-1 to the controller 170-1. In addition, after the remote station 110-3 completes data collection, it can generate and send a completion response 190-2 to the controller 170-1. After the controller 170-1 in the local station 110-1 receives the completion responses sent by all the remote stations, it can perform data collection in the local station 110-1, that is, merge the valid data 1301-1, the valid data 1401-1, and the valid data 1501-1 into the target data block 160-1, thereby completing data collection and releasing the source data block.

Figure 2:
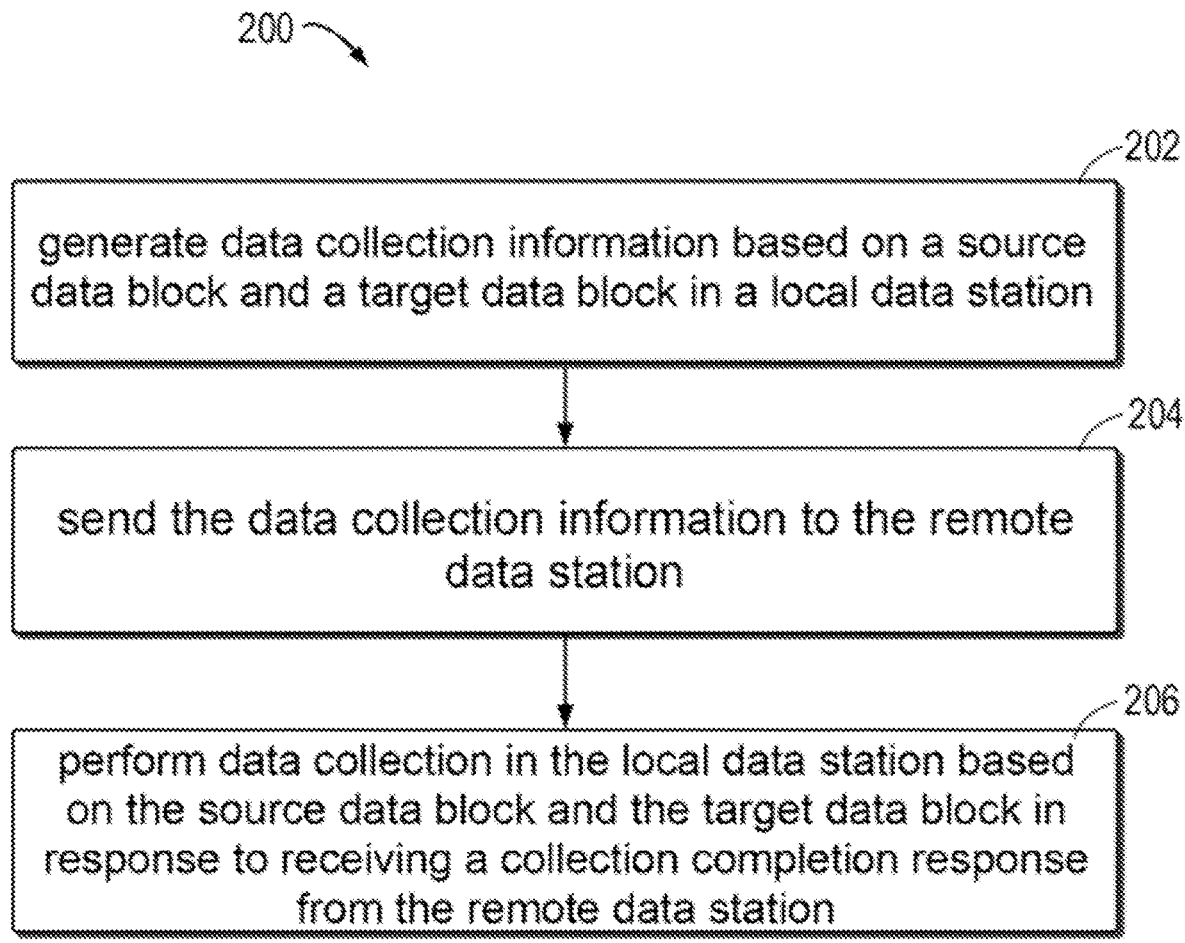
FIG. 2 shows a flowchart of a method for data collection according to the present disclosure.

FIG. 2 shows a flowchart of a method for data collection 200 according to the present disclosure. Referring to FIG. 2, at block 202, data collection information can be generated based on a source data block and a target data block in a local data station. For example, referring to FIG. 1, the controller 170-1 in the local station 110-1 can generate the collection information 180 based on the source data block 130-1, the source data block 140-1, the source data block 150-1, and the target data block 160-1.

At block 204, the data collection information can be sent to the remote data station, where data collection of the remote data station is performed based on the data collection information. For example, referring to FIG. 1, the controller 170-1 in the local station 110-1 can send the collection information 180 to the remote station 110-2, and data collection in the remote station 110-2 can be performed based on the collection information. In addition, the controller 170-1 in the local station 110-1 can send the collection information 180 to the remote station 110-4, and data collection in the remote station 110-3 can be performed based on the collection information.

At block 206, data collection can be performed in the local data station based on the source data block and the target data block in response to receiving a collection completion response from the remote data station. For example, referring to FIG. 1, in response to receiving the completion response 190-1 from the remote station 110-2 and the completion response 190-2 from the remote station 110-3, the controller 170-1 in the local station 110-1 can perform data collection base on the source data blocks, the source data block 130-1, the source data block 140-1, the source data block 150-1, and the target data block 160-1.

Therefore, according to the method 200 of the embodiment of the present disclosure, since the size of the collection information is much smaller than that of the valid data block, the amount of data sent by the local data storage station to other remote data storage stations can be significantly reduced in the data synchronization of the garbage collection task, thereby improving the efficiency of the garbage collection task and avoiding the impact on the storage performance of the local data storage station and other program tasks.

Figure 3A:
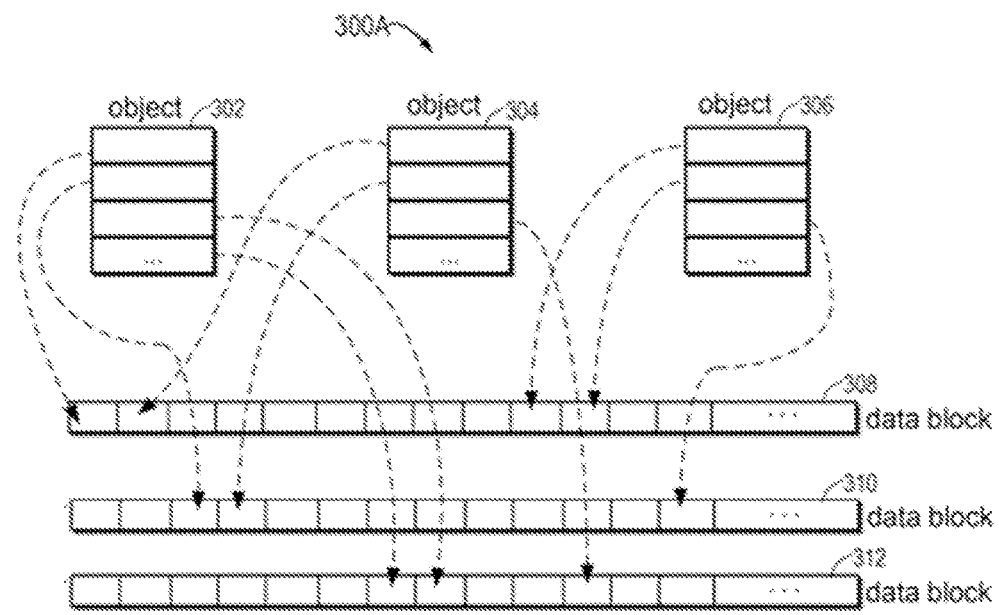
FIG. 3A shows a schematic diagram of the relationship between data blocks and objects of a data storage station according to an embodiment of the present disclosure.

FIG. 3A shows a schematic diagram 300A of the relationship between data blocks and objects of a data storage station according to an embodiment of the present disclosure. As shown in FIG. 3A, in the storage station, data is written in the form of data blocks, such as the data block 308, the data block 310, and the data block 312. In some embodiments, the data block 308, the data block 310, and the data block 312 may be containers of a 128 MB logical space. The storage stations can support replication between geographical stations to increase availability and flexibility by preventing failures in the range of a station. For example, they can support replication between the local station and a remote station. Each data block in a data storage station can store data from different objects, for example, the data block 308, the data block 310, and the data block 312 can store data from the object 302, the object 304, and the object 306, and the correspondence between them is shown with reference to the dashed lines shown in FIG. 3A. When the object 302, the object 304, and the object 306 are updated or deleted, the data that is no longer referenced in the data blocks is called garbage data.

In some embodiments, the space can be collected by means of complete garbage collection, which can collect the whole data block, that is, when the data in the whole data block is marked as garbage data, the collection operation is performed, thus releasing the memory space of the data block. For example, when all the data in the data block 308 is garbage data, a complete collection operation is performed on the data block 308, thereby releasing the memory space of the data block 308.

In some embodiments, space can be collected by means of partial garbage collection, which can detect the proportion of garbage data in the source data block. When the garbage data occupies a certain proportion of the source data block (e.g., more than ⅔ or 66.67%), partial garbage collection can be started to merge the valid data parts in the source data block into the target data block, thereby releasing the memory space of the source data block. For example, when a certain proportion of data in the data block 308 is garbage data, a partial collection operation can be performed on the data block 308 to merge the valid data parts in the data block 308 into the target data block, thereby releasing the memory space of the data block 308.

Figure 3B:
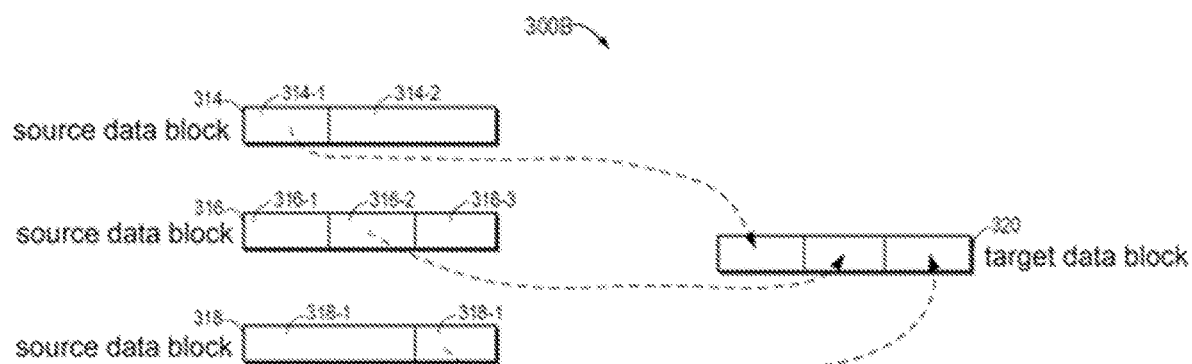
FIG. 3B shows a schematic diagram of a process of partial garbage collection according to an embodiment of the present disclosure.

FIG. 3B shows a schematic diagram of a process of partial garbage collection 300B according to an embodiment of the present disclosure. As shown in FIG. 3B, the valid data 314-1 in the source data block 314 can be moved to the target data block 320, and the garbage data 314-2 in the source data block 314 can be removed to collect and release the storage space of the source data block 314. In some embodiments, performing data collection at the local data station may include obtaining valid data from the source data block; and merging the valid data into the target data block. In some embodiments, performing data collection at the local data station may further include collecting the storage space of the source data block in response to the valid data being merged into the target data block.

Similarly, the valid data 316-2 in the source data block 316 can be moved to the target data block 320, and the garbage data 316-1 and the garbage data 316-3 in the source data block 316 can be removed to release the storage space of the source data block 316; and the valid data 318-2 in the source data block 318 is moved to the target data block 320, and the garbage data 318-1 in the source data block 314 can be removed to release the storage space of the source data block 318. Since the target data block 320 is generated in the data storage node, it is necessary to replicate the target data block to other data storage stations.

Figure 4A:
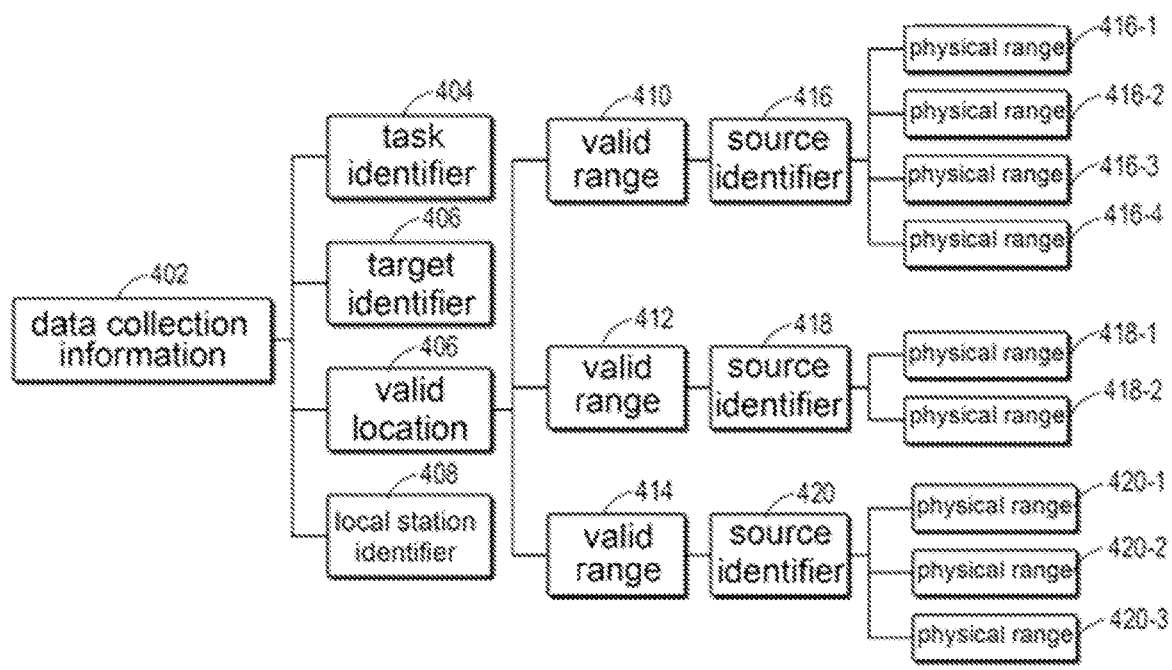
FIG. 4A shows a schematic diagram of the content of data collection information according to an embodiment of the present disclosure.

FIG. 4A shows a schematic diagram of the content 400A of the data collection information according to an embodiment of the present disclosure. As shown in FIG. 4A, the data collection information 402 may include a task identifier 404. The task identifier 404 can be used to identify which data collection task the data collection information 402 belongs to. For example, the local station can run multiple data collection tasks simultaneously, so the task identifier in the data collection information 402 is needed to identify the data collection task. The data collection information 402 may include a target identifier 406. The target identifier 406 may indicate with which target data block the valid data is merged (e.g., the target data block 320 in FIG. 3B).

The data collection information 402 may include a valid location 406. The valid location 406 may include a valid range 408, a valid range 410, and a valid range 412. Each of the multiple valid ranges corresponds to the source identifier of a source data block. For example, the valid range 408 corresponds to the source identifier 416, the valid range 410 corresponds to the source identifier 418, and the valid range 412 corresponds to the source identifier 420. It should be understood that three valid ranges and source data blocks are shown here for exemplary purposes only, and other embodiments of the present disclosure may include fewer or more valid ranges and source data blocks. In some embodiments, generating the data collection information may include obtaining the data location of the valid data in the source data block; and generating the data collection information based on the data location, the source identifier, and the target identifier, where the source identifier is the identifier of the source data block, and the target identifier is the identifier of the target data block.

Each source identifier may include multiple physical ranges. For example, the source identifier 416 may include the physical ranges 416-1 to 416-4, the source identifier 418 may include the physical ranges 418-1 to 418-2, and the source identifier 420 may include the physical ranges 420-1 to 420-3. For example, the physical ranges 416-1 to 416-4 may indicate that data in the four ranges on the source data block corresponding to the source identifier 416 are valid data, and these valid data may be merged into the target data block corresponding to the target identifier 406. In addition, the data collection information 402 may also include a local station identifier 408 to inform a remote station of which data storage station the data collection information comes from. It should be understood that the content of the collection information shown here is for exemplary purposes only, and the embodiments of the present disclosure do not limit the content of the collection information.

Figure 4B:
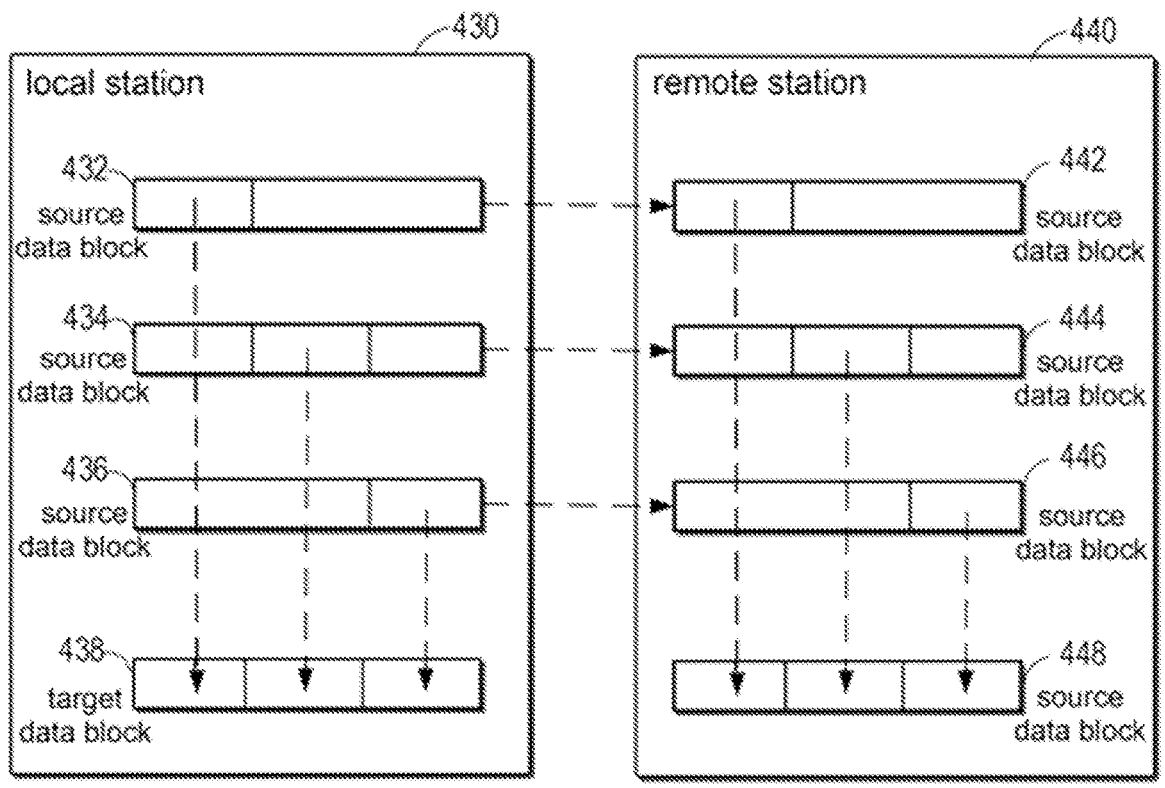
FIG. 4B shows a schematic diagram of a process of data synchronization according to an embodiment of the present disclosure.

FIG. 4B shows a schematic diagram of a process 400B of data synchronization according to an embodiment of the present disclosure. As shown in FIG. 4B, the local station 430 includes a source data block 432, a source data block 434, and a source data block 436. The data in the remote station 440 is consistent with the data in the local station 430, that is, the data in the source data block 442, the source data block 444, and the source data block 446 is consistent with that in the source data block 432, the source data block 434, and the source data block 436 included in the local station 430. In other words, these data blocks have been synchronized before. Therefore, when it is necessary to synchronize the target data block 438, instead of directly synchronizing the data block 438 itself, the position of the valid data in the source data block is obtained by using the data collection information (e.g., the data collection information shown in FIG. 4A), and the valid data can be merged into the target data block 448.

Figure 5:
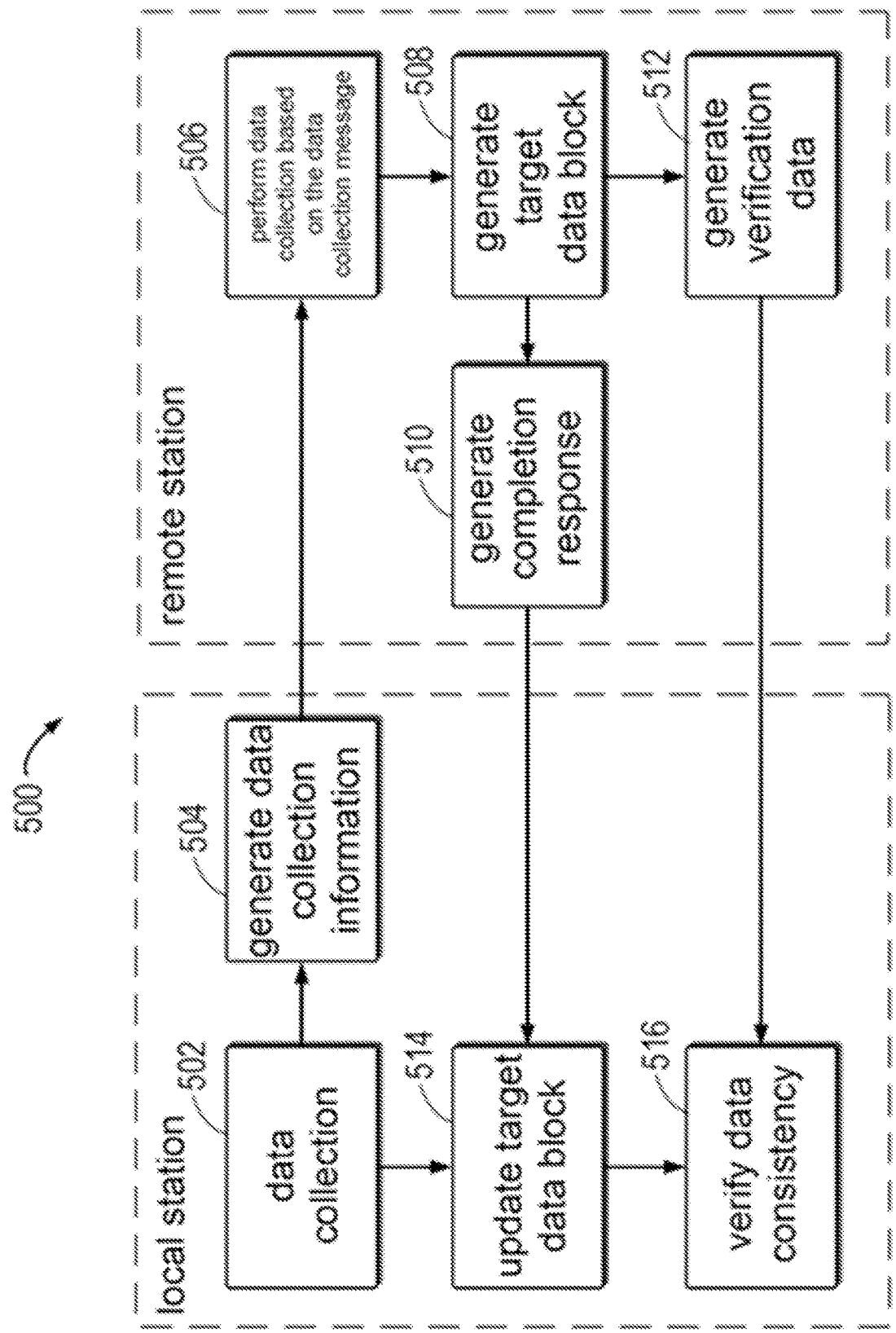
FIG. 5 shows a schematic diagram of a process of data collection according to an embodiment of the present disclosure.

FIG. 5 shows a schematic diagram of a process 500 of data collection according to an embodiment of the present disclosure. As shown in FIG. 5, at block 502, a data collection task can be started. At block 504, data collection information can be generated. For example, the data collection information as shown in FIG. 4A can be generated. It can indicate the local station, the target data block, the collection task identifier, the location of the valid data, and the like. At block 506, data collection can be performed at a remote station based on the data collection information. At block 508, a target data block can be generated. For example, as shown in FIG. 4B, the valid data can be obtained based on the location of the valid data indicated in the data collection information, and these valid data can be merged into the target data block, thereby releasing the storage space of the source data block. At block 510, a completion response can be generated and sent to the local station. For example, the completion response can be used to inform the local station that the data collection at the remote station has been completed. At block 512, verification data can be generated. For example, a hash value of the target data block can be generated as verification data, and the verification data can be sent to the local station. In some embodiments, the verification data can be received from the remote data station; and the consistency between the local data station and the remote data station can be determined based on the verification data.

At block 514, the target data block can be updated. For example, the target data block can be updated at the local station after the local station receives the completion responses from all the remote stations. At block 516, consistency of the target data block can be verified. As the target data block of the remote station is not directly obtained from the target data block of the local station, it needs to be verified to ensure data consistency. For example, a hash value of the target data block of the local station can be generated and compared with a hash value from the remote station to determine the consistency of the target data block. In some embodiments, when the verification data is a hash value, determining the consistency between the local data station and the remote data station includes generating a target hash value based on the target data block in the local data station; and determining the consistency between the local data station and the remote data station based on the target hash value and the verification data.

Figure 6:
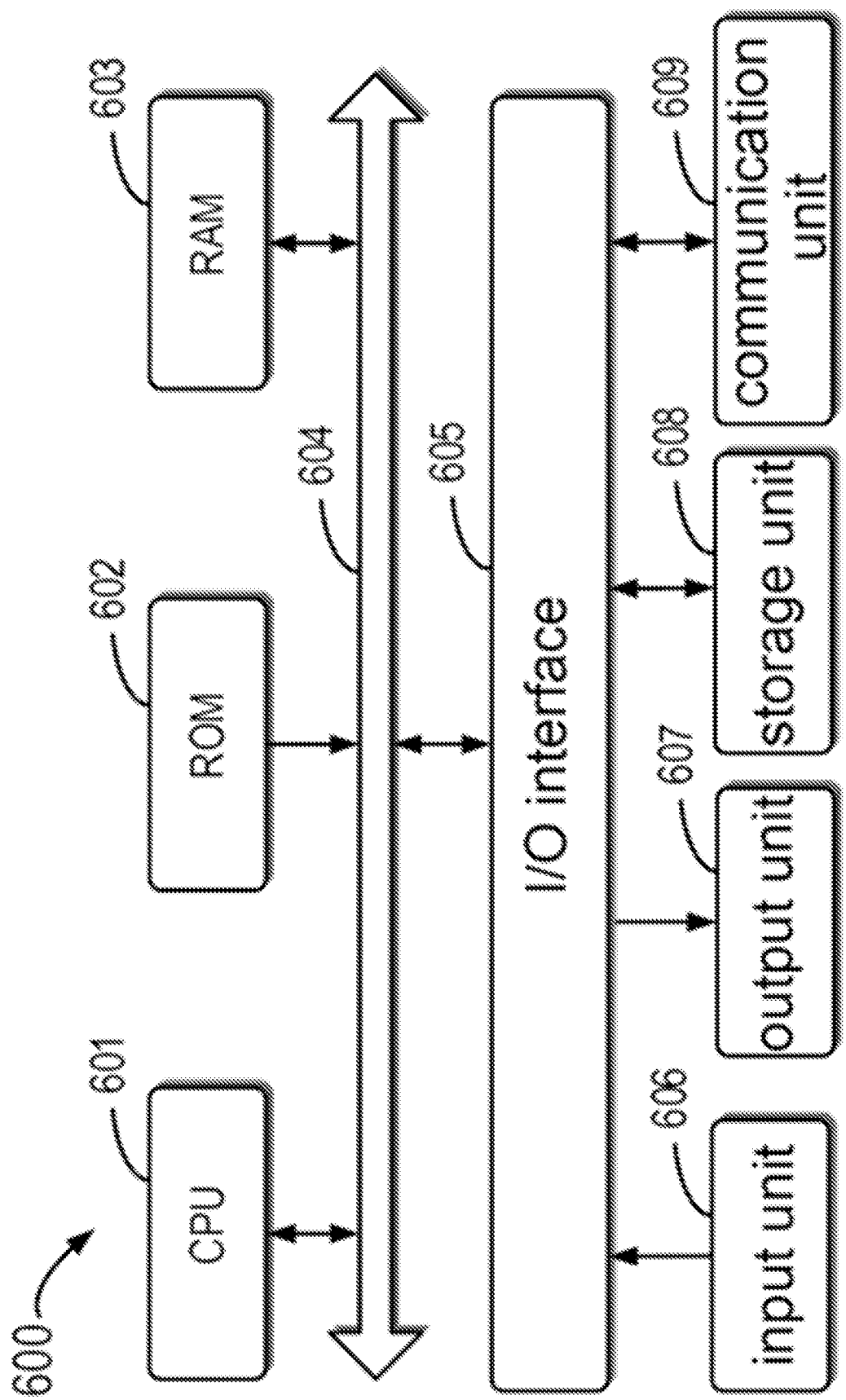
FIG. 6 shows a schematic block diagram of a device that can be used to implement the embodiments of the present disclosure.

FIG. 6 shows a schematic block diagram of a device 600 that may be used to implement the embodiments of the present disclosure. The device 600 may be a device or an apparatus as described in the embodiments of the present disclosure. As shown in FIG. 6, the device 600 includes a central processing unit (CPU) 601 that can perform various appropriate actions and processing according to the computer program instructions stored in a read-only memory (ROM) 602 or computer program instructions loaded from a storage unit 608 to a random access memory (RAM) 603. Various programs and data required for the operation of the device 600 may also be stored in the RAM 603. The CPU 601, the ROM 602, and the RAM 603 are connected to each other through a bus 604. An input/output (I/O) interface 605 is also connected to the bus 604.

Multiple components in the device 600 are connected to the I/O interface 605, including: an input unit 606, such as a keyboard and a mouse; an output unit 607, such as various types of displays and speakers; the storage unit 608, such as a magnetic disk and a compact disc; and a communication unit 609, such as a network card, a modem, and a wireless communication transceiver. The communication unit 609 allows the device 600 to exchange information/data with other devices via a computer network, such as the Internet, and/or various telecommunication networks.

The various methods or processes described above may be performed by the processing unit 601. For example, in some embodiments, the methods may be implemented as a computer software program that is tangibly included in a machine-readable medium such as the storage unit 608. In some embodiments, part of or all the computer program may be loaded and/or installed onto the device 600 via the ROM 602 and/or the communication unit 609. When the computer program is loaded onto the RAM 603 and executed by the CPU 601, one or more steps or actions of the methods or processes described above can be performed.

In some embodiments, the methods and processes described above may be implemented as a computer program product. The computer program product may include a computer-readable storage medium on which computer-readable program instructions for performing various example embodiments of the present disclosure are loaded.

The computer-readable storage medium may be a tangible device that can maintain and store instructions to be used by an instruction execution device. For example, the computer-readable storage medium may be, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit can execute the computer-readable program instructions so as to implement various example embodiments of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium having the instructions stored therein includes an article of manufacture which includes instructions for implementing various example embodiments of the functions/actions specified in one or more blocks in the flowcharts and/or block diagrams.

The computer-readable program instructions can be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functions, and operations of possible implementations of the device, the method, and the computer program product according to multiple embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions denoted in the blocks may also occur in an order different from that shown in the drawings. For example, two consecutive blocks may in fact be executed substantially concurrently, and sometimes they may also be executed in a reverse order, depending on the functions involved. It should be further noted that each block in the block diagrams and/or flowcharts as well as a combination of blocks in the block diagrams and/or flowcharts may be implemented by a dedicated hardware-based system executing specified functions or actions, or by a combination of a dedicated hardware and computer instructions.

The embodiments of the present disclosure have been described above. The above description is illustrative, rather than exhaustive, and is not limited to the various disclosed embodiments. Numerous modifications and alterations are apparent to persons of ordinary skill in the art without departing from the scope and spirit of the described embodiments. The selection of terms as used herein is intended to best explain the principles and practical applications of the various embodiments or the technical improvements to technologies on the market, or to enable other persons of ordinary skill in the art to understand the embodiments disclosed herein.

What is claimed is:

1. A method, comprising:
    identifying, by a local data station comprising at least one processor, a group of source data blocks in a storage device of the local data station that satisfies a criterion for performance of partial garbage collection on the group of source data blocks, wherein each source data block of the group of source data blocks comprises respective garbage data and respective valid data;

performing, by the local data station, a partial garbage collection process on the group of source data blocks, wherein the partial garbage collection process comprises:

generating, by the local data station, a target data block in the storage device of the local data station, wherein the target data block comprises the respective valid data of each of the source data blocks and does not contain the respective garbage data of each of the source data blocks;

generating, by the local data station, data collection information based on the group of source data blocks and the target data block, wherein the data collection information comprises:

for each source data block of the group of source data blocks, a respective source identifier for the source data block and respective one or more physical location ranges of the respective valid data in the source data block, wherein the data collection information does not comprise the respective valid data of the source data blocks nor information about the respective garbage data of the source data blocks;

sending, by the local data station, the data collection information to a remote data station that stores replicated source data blocks matching the group of source data blocks, wherein the data collection information causes the remote data station to perform the partial garbage collection on the replicated source data blocks to generate a replicated target data block corresponding to the target data block of the local data station based on the data collection information;

receiving, by the local data station, a completion response from the remote data station, wherein the completion response indicates that the replicated target data block has been generated at the remote data station; and in response to receiving the completion response, releasing, by the local data station, the group of source data blocks from the storage device of the local data station.

2. The method of claim 1, wherein the data collection information further comprises a target identifier of the target data block.

3. The method of claim 1, wherein the partial garbage collection process does not send the target data block from the local data station to the remote data station.

4. The method of claim 1, wherein the generating of the target data block at the local data station comprises:

obtaining the respective valid data from each of the source data blocks; and merging the respective valid data from each of the source data blocks into the target data block.

5. The method of claim 1, wherein the completion response comprises verification data associated with the replicated target data block, and the method further comprising:

determining a value representative of a consistency between the target data block in the local data station and the replicated target data block in the remote data station based on the verification data.

6. The method of claim 5, wherein the verification data is a hash value based on the replicated target data block, and wherein determining the value representative of the consistency between the target data block of the local data station and the replicated target data block of the remote data station comprises:

generating a target hash value based on the target data block in the local data station; and determining the value representative of the consistency between the target data block in the local data station and the replicated target data block in the remote data station based on the target hash value and the verification data.

7. The method of claim 1, wherein the data collection information comprises:

for one of the source data blocks of the group of source data blocks, a respective plurality physical location ranges of the respective valid data in the one of the source data blocks.

8. A local data station, comprising:

a storage device;

a processing unit; and a memory coupled to the processing unit and having instructions stored therein that, when executed by the processing unit, perform actions, comprising:

identifying a group of source data blocks in the storage device of the local data station that satisfies a criterion for performance of partial garbage collection on the group of source data blocks, wherein each source data block of the group of source data blocks comprises respective garbage data and respective valid data and does not contain the respective garbage data of each of the source data blocks performing a partial garbage collection process on the group of source data blocks, wherein the partial garbage collection process comprises:

generating a target data block in the storage device of the local data station, wherein the target data block comprises the respective valid data of each of the source data blocks;

generating data collection information based on the group of source data blocks and the target data block, wherein the data collection information comprises:

for each source data block of the group of source data blocks, a respective source identifier for the source data block and respective one or more physical location ranges of the respective valid data in the source data block, wherein the data collection information does not comprise the respective valid data of the source data blocks nor information about the respective garbage data of the source data blocks;

sending the data collection information to a remote data station that stores replicated source data blocks matching the group of source data blocks, wherein the data collection information causes the remote data station to perform the partial garbage collection on the replicated source data blocks to generate a replicated target data block corresponding to the target data block of the local data station based on the data collection information;

receiving, by the local data station, a completion response from the remote data station, wherein the completion response indicates that the replicated target data block has been generated at the remote data station; and in response to receiving the completion response, releasing the group of source data blocks from the storage device of the local data station.

9. The local data station of claim 8, wherein the data collection information further comprises a target identifier of the target data block.

10. The local data station of claim 8, wherein the partial garbage collection process does not send the target data block from the local data station to the remote data station.

11. The local data station of claim 8, wherein the generating of the target data block at the local data station comprises:
obtaining the respective valid data from each of the source data blocks; and
merging the respective valid data from each of the source data blocks into the target data block.

12. The local data station of claim 8, wherein the completion response comprises verification data associated with the replicated target data block, and the actions further comprise:
determining a consistency between the target data block in the local data station and the replicated target data block in the remote data station based on the verification data.

13. The local data station of claim 12, wherein the verification data is a hash value based on the replicated target data block, and wherein determining the consistency between the target data block in the local data station and the replicated target data block in the remote data station comprises:
generating a target hash value based on the target data block in the local data station; and
determining the consistency between the target data block in the local data station and the replicated target data block in the remote data station based on the target hash value and the verification data.

14. The local data station of claim 8, wherein the data collection information comprises:
for one of the source data blocks of the group of source data blocks, a respective plurality physical location ranges of the respective valid data in the one of the source data blocks.

15. A computer program product stored on a non-transitory computer-readable medium and comprising machine-executable instructions, the machine-executable instructions, when executed, causing a local data station to perform operations, comprising:
identifying a group of source data blocks in a storage device of the local data station that satisfies a criterion for performance of partial garbage collection on the group of source data blocks, wherein each source data block of the group of source data blocks comprises respective garbage data and respective valid data, and does not contain the respective garbage data of each of the source data blocks;
performing a partial garbage collection process on the group of source data blocks, wherein the partial garbage collection process comprises:
generating a target data block in the storage device of the local data station, wherein the target data block comprises the respective valid data of each of the source data blocks;
generating data collection information based on the group of source data blocks and the target data block, wherein the data collection information comprises:
for each source data block of the group of source data blocks, a respective source identifier for the source data block and respective one or more physical location ranges of the respective valid data in the source data block, wherein the data collection information does not comprise the respective valid data of the source data blocks nor information about the respective garbage data of the source data blocks;
sending the data collection information to a remote data station storing replicated source data blocks matching the group of source data blocks, wherein the data collection information causes the remote data station to perform partial garbage collection on the replicated source data blocks to generate a replicated target data block corresponding to the target data block of the local data station based on the data collection information;
receiving, by the local data station, a completion response from the remote data station, wherein the completion response indicates that the replicated target data block has been generated at the remote data station; and
in response to receiving the completion response, releasing the group of source data blocks from the storage device of the local data station.

16. The computer program product of claim 15, wherein the data collection information further comprises a target identifier of the target data block.

17. The computer program product of claim 15, wherein the partial garbage collection process does not send the target data block from the local data station to the remote data station.

18. The computer program product of claim 15, wherein the completion response comprises verification data associated with the replicated target data block, and the operations further comprise:
determining a consistency between the target data block in the local data station and the replicated target data block in the remote data station based on the verification data.

19. The computer program product of claim 15, wherein the verification data is a hash value based on the replicated target data block, and wherein determining the consistency between the target data block in the local data station and the replicated target data block in the remote data station comprises:
generating a target hash value based on the target data block in the local data station; and
determining the consistency between the target data block in the local data station and the replicated target data block in the remote data station based on the target hash value and the verification data.

20. The computer program product of claim 15, wherein the data collection information comprises:
for one of the source data blocks of the group of source data blocks, a respective plurality physical location ranges of the respective valid data in the one of the source data blocks.

* * * * *